United States Patent [19]
Mallik

[11] Patent Number: 5,838,466
[45] Date of Patent: Nov. 17, 1998

[54] HIDDEN HOLOGRAMS AND USES THEREOF

[75] Inventor: Donald W. Mallik, Dunwoody, Ga.

[73] Assignee: Printpack Illinois, Inc., Elgin, Ill.

[21] Appl. No.: 764,916

[22] Filed: Dec. 13, 1996

[51] Int. Cl.$^6$ ............... G03H 1/02; B42D 15/00; B42D 15/10; B32B 3/00
[52] U.S. Cl. ............... 359/2; 359/1; 283/901; 283/903; 283/86; 283/94; 264/1.34; 264/134
[58] Field of Search ............... 359/2, 1, 900; 283/901, 903, 86, 94, 100, 101, 109; 264/1.34, 134

[56] References Cited

U.S. PATENT DOCUMENTS

| | | |
|---|---|---|
| 4,315,665 | 2/1982 | Haines . |
| 4,837,061 | 6/1989 | Smits et al. ............... 283/108 |
| 4,913,858 | 4/1990 | Miekka et al. ............... 264/134 |
| 4,921,319 | 5/1990 | Mallik . |
| 5,037,101 | 8/1991 | McNulty . |
| 5,044,707 | 9/1991 | Mallik . |
| 5,085,514 | 2/1992 | Mallik et al. ............... 359/2 |
| 5,116,548 | 5/1992 | Mallik et al. . |
| 5,145,212 | 9/1992 | Mallik . |
| 5,500,765 | 3/1996 | Eichenlaub ............... 359/462 |
| 5,591,527 | 1/1997 | Lu ............... 383/72 |

*Primary Examiner*—Jon W. Henry
*Attorney, Agent, or Firm*—Majestic, Parsons, Siebert & Hsue

[57] ABSTRACT

Replicas of a surface relief hologram, or other light diffraction pattern, are coated with a transparent material having substantially the same refractive index as the holograms to conform to the surface relief patterns and thus hide the hologram. The coating is pealed by hand off of the surface relief pattern in order to reveal an image visible in light reflected from the hologram. Such hidden holograms can be attached to a greeting card to reveal a greeting when the coating is removed, attached to pages of magazines or books to carry an advertising message, and the like. Other uses include making lottery tickets or other indications of a prize from such holograms, since the indication of any prize won by the holder remains hidden until the coating is pulled off, even though the coating is optically transparent.

21 Claims, 6 Drawing Sheets

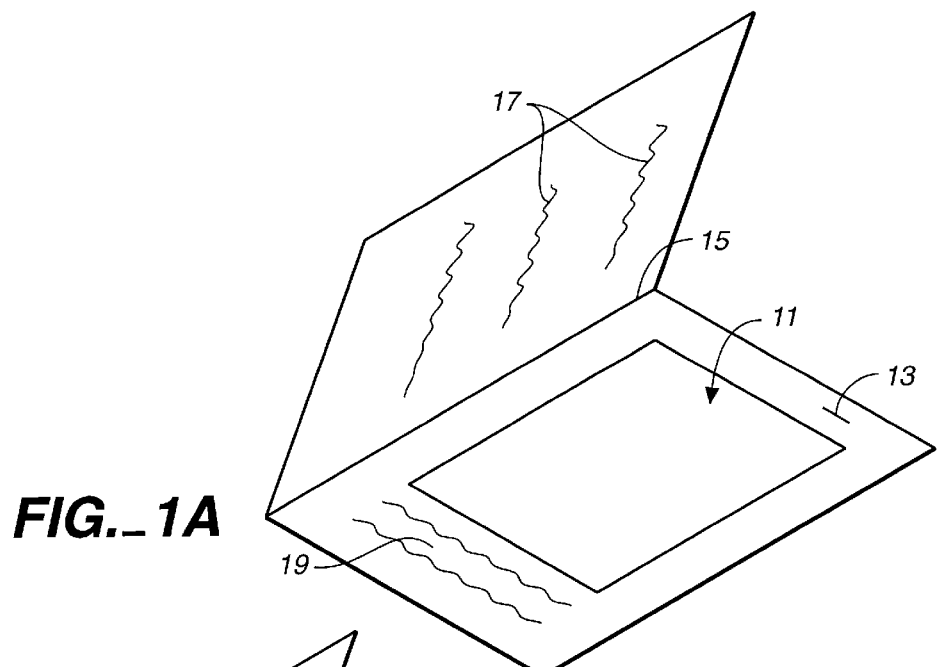
FIG._1A
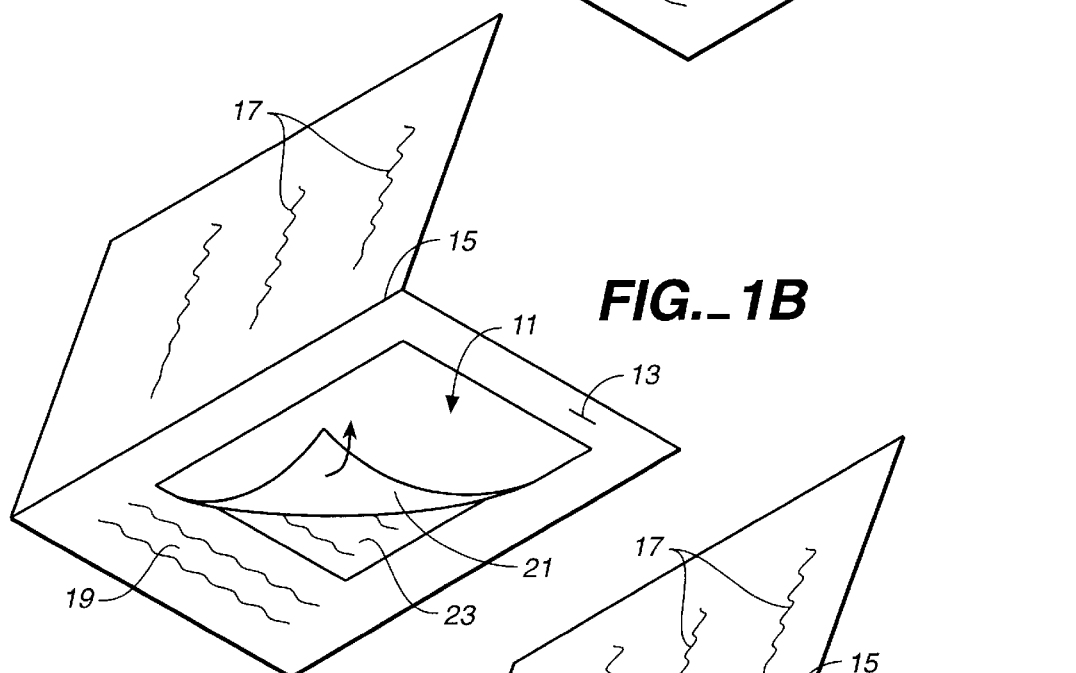
FIG._1B
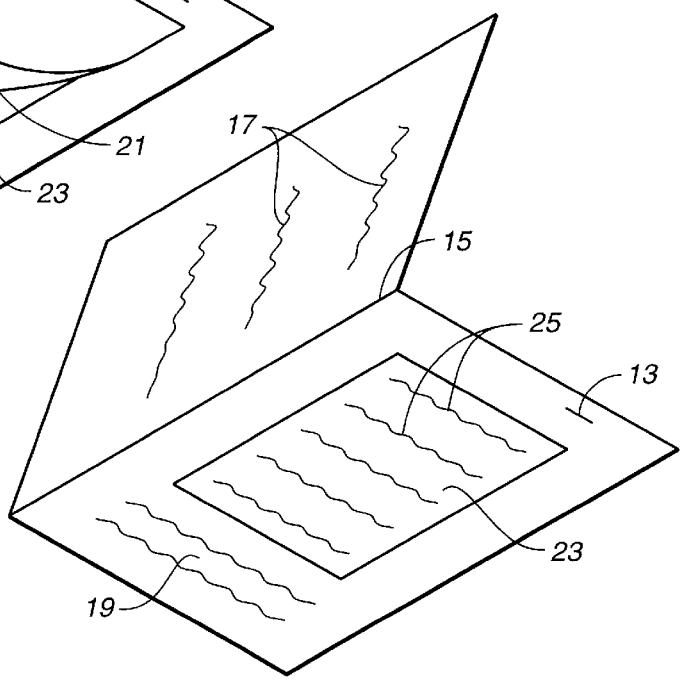
FIG._1C

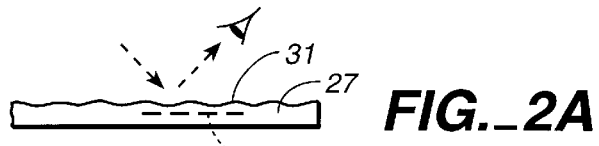
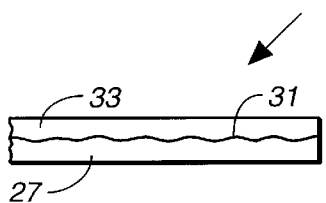
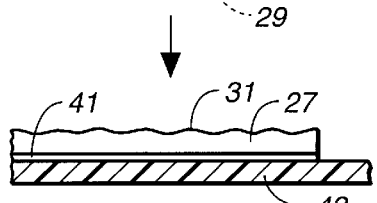
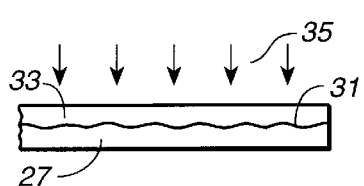
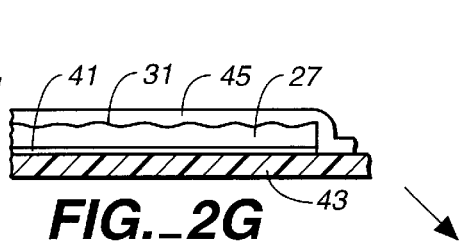
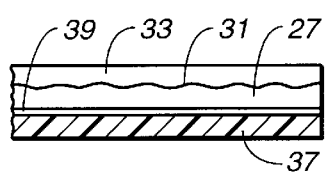
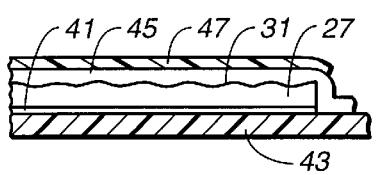
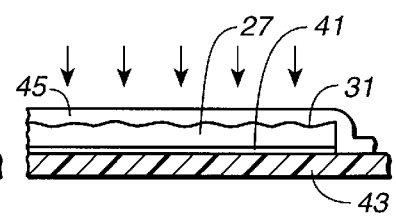
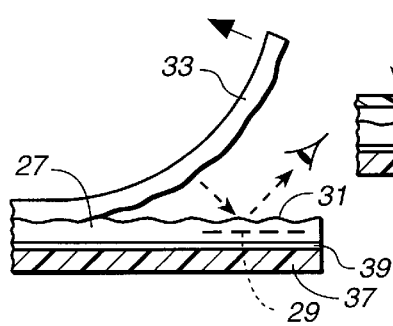
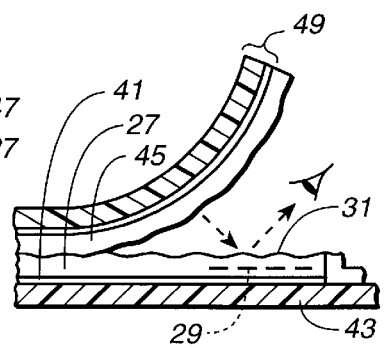
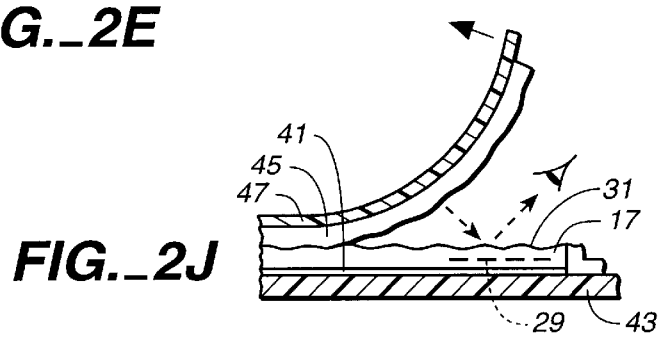

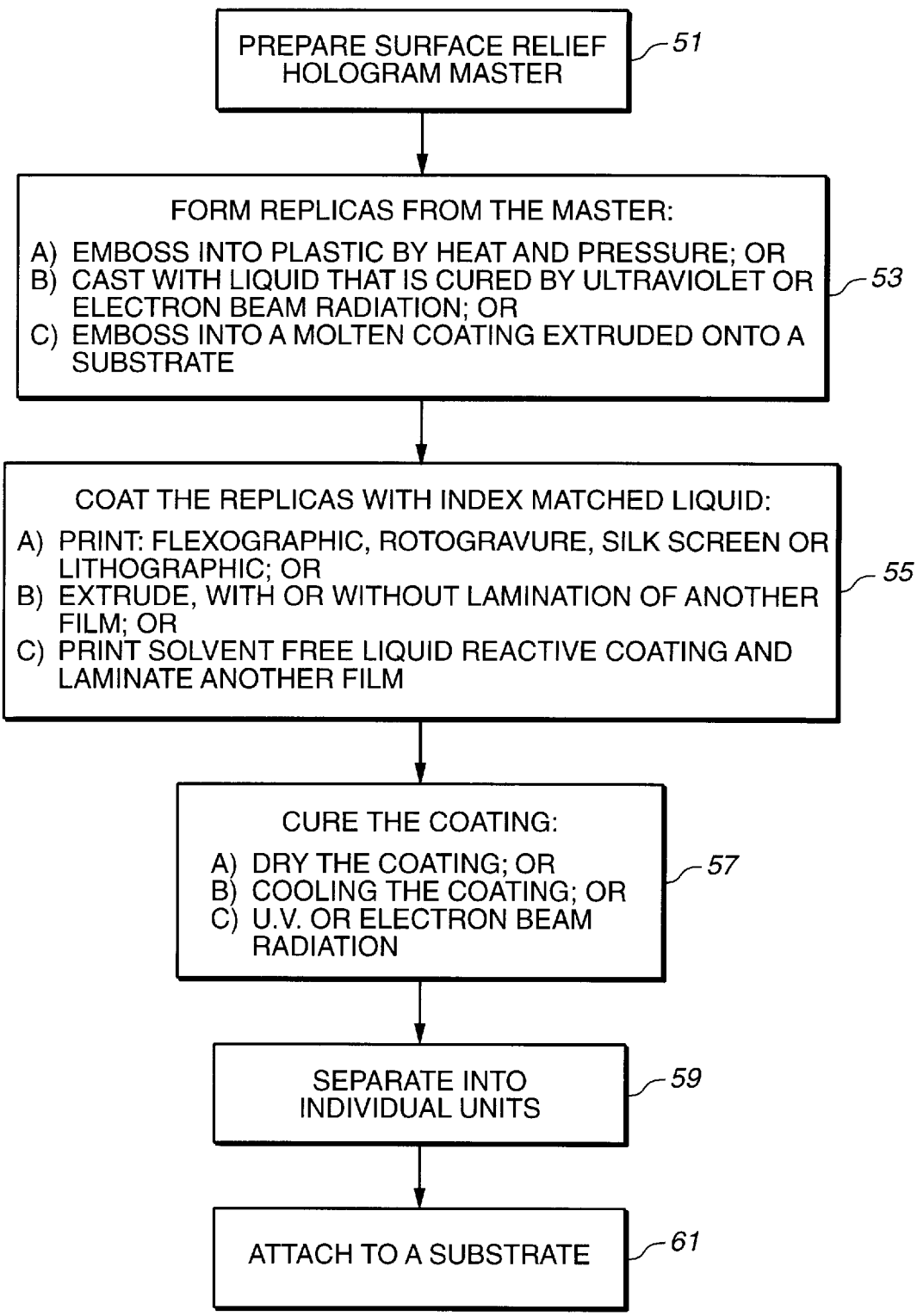
FIG._3

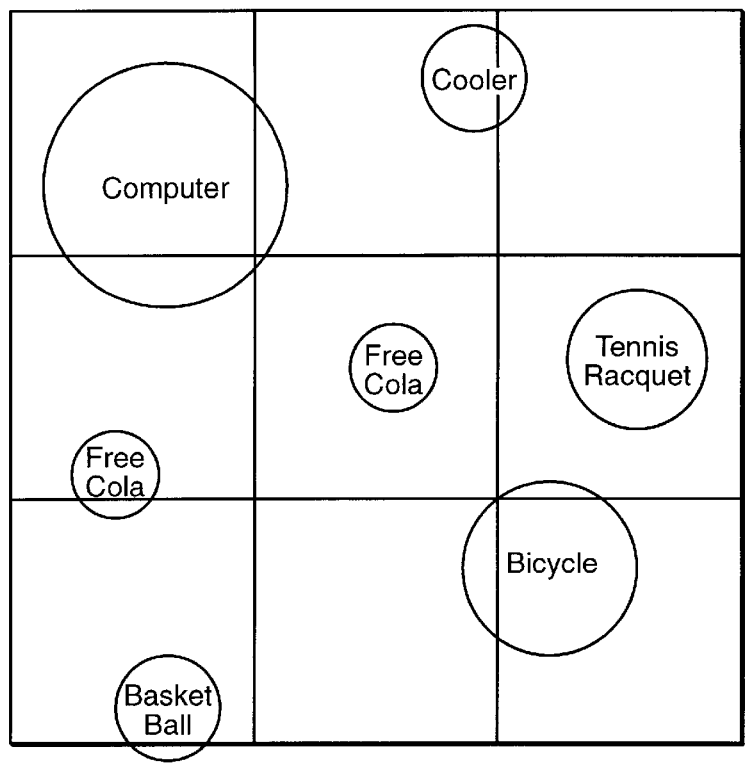
FIG._4
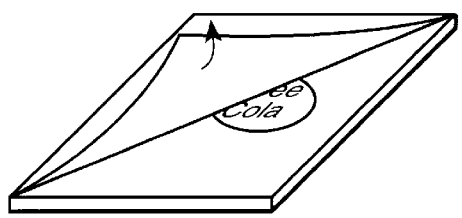
FIG._5
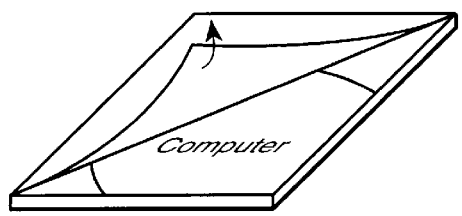
FIG._6

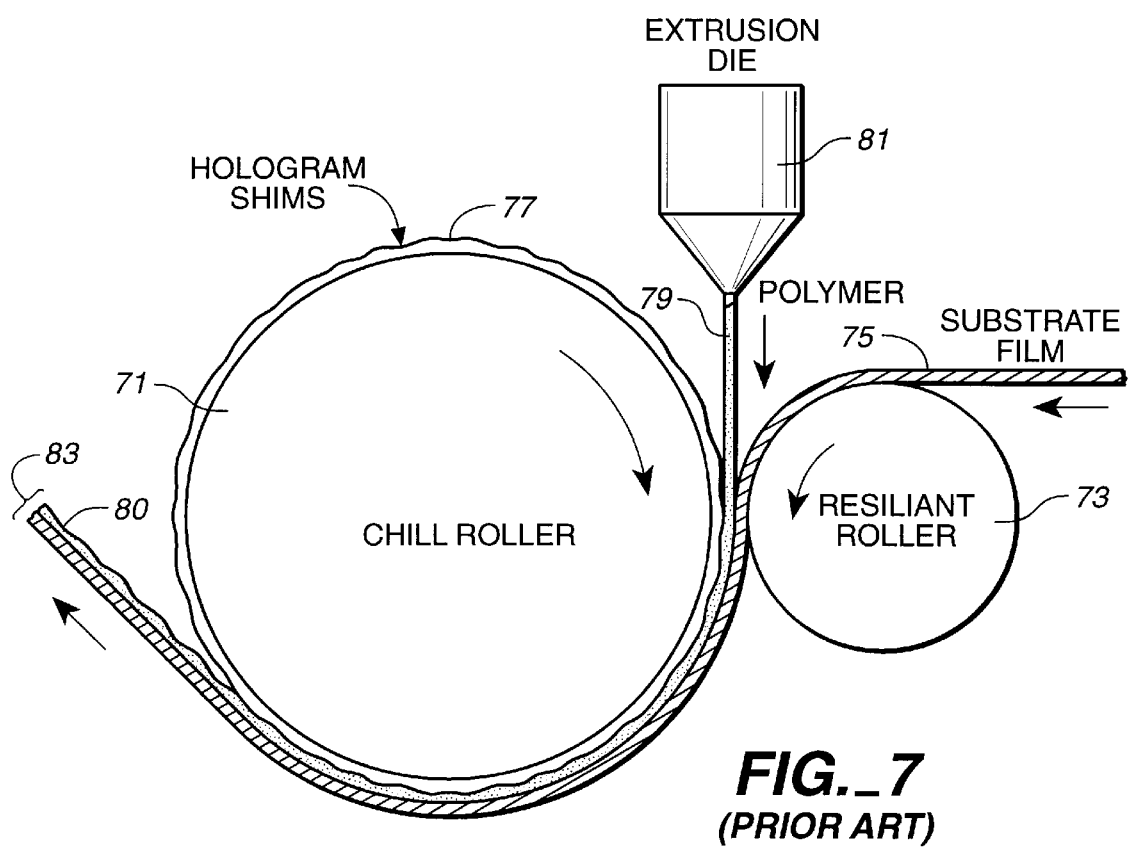
FIG._7
*(PRIOR ART)*

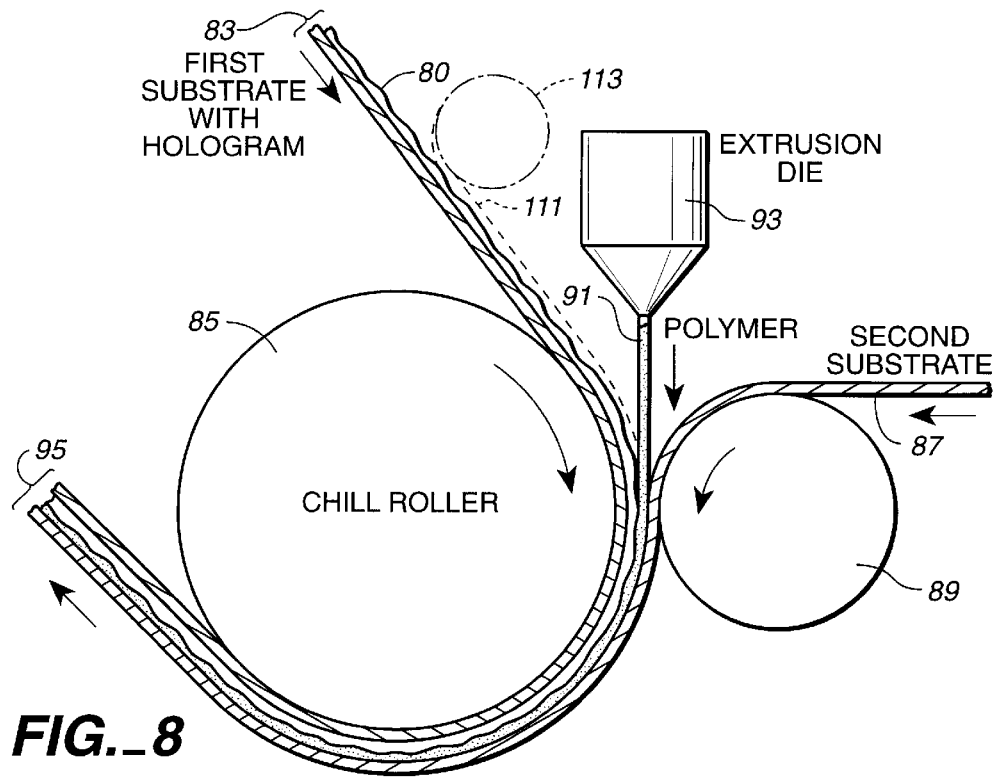
FIG._8
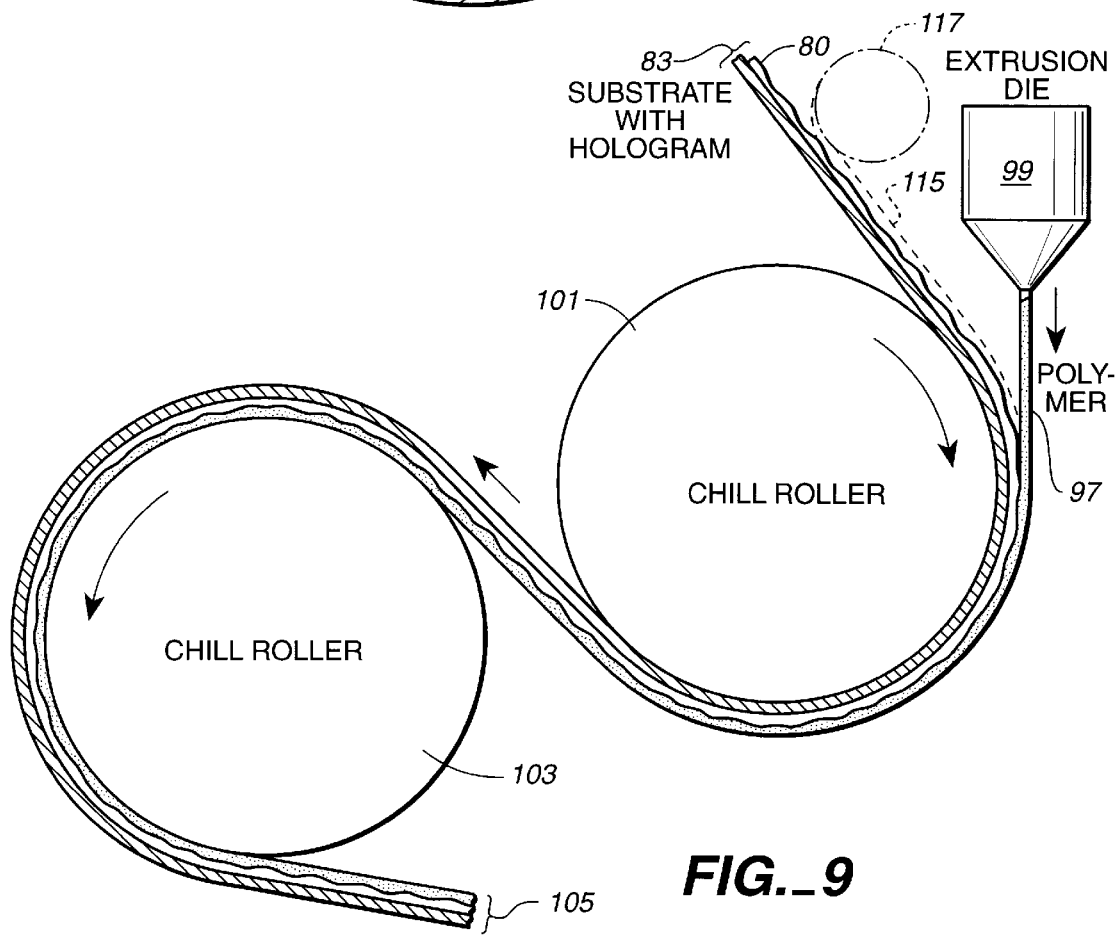
FIG._9

HIDDEN HOLOGRAMS AND USES THEREOF

BACKGROUND OF THE INVENTION

This invention relates generally to the art of holography, and, more specifically, to the manufacture and use of hologram replicas.

A primary use of holograms that is familiar to the public is as authenticating devices on credit cards, driver's licenses and the like. There is also a widespread use of holograms as novelties, both alone and in a form attached to various types of documents and objects. Such holograms are characterized by reconstructing, in light reflected from them, an image of an object used to make the holograms, or some other recognizable distribution of light.

The process of making such holograms is well known. A master hologram is first optically recorded in a photoresist material which is subsequently processed to form a microscopic surface relief pattern corresponding to the light interference pattern that is being recorded. One or more master hologram plates are then made from the photoresist master for use in mass replication machinery. Replicas are manufactured by such machinery at a high speed by one of several known embossing or casting techniques. The replicas are formed in a plastic film material with the surface relief pattern on one surface thereof. The surface relief pattern is then usually coated with a very thin layer of metal in order to increase its reflectivity. The hologram replicas may further be coated for protection, and are usually attached to some substrate or incorporated into some other object.

Images are viewable at all times from commercially available holograms, when properly positioned in adequate light. It is a primary object of the present invention, however, to provide hologram replicas where the hologram is hidden in order to block viewing of the recorded image until the viewer desires to see it.

It is another principal object of the present invention to provide various applications of such hidden holograms.

SUMMARY OF THE INVENTION

These and additional objects are accomplished by the various aspects of the present invention, wherein, briefly and generally, the process of manufacturing surface relief hologram replicas includes covering the surface relief pattern with a transparent material layer that conforms to the pattern and which has substantially the same refractive index as that of the underlying hologram replica. This layer is made to be removable from the surface relief pattern by hand without harming the pattern, thereby allowing the hologram to remain hidden until its owner desires to peel off this top layer. The layer is formed directly on the surface relief pattern without any reflective layer being present, by means of a casting, coating or extrusion process. The hologram becomes hidden, even when the covering layer is transparent, because of the matching of the refractive indices of the coating and the underlying hologram replica.

There are many useful applications of such a hidden hologram. One is as a lottery ticket or some other indication of a prize having been won. Since they can be distributed without knowing the contents of the hologram image, the end user is able to learn whether a prize has been won or not by peeling off the top layer. Another application is as part of a greeting card, wherein the recipient of the greeting card sees a part of the greeting only after removing the covering layer. Such a hidden hologram is also useful for advertising purposes by attachment to pages of magazines or books.

Additional objects, advantages and features of the various aspects of the present invention will become apparent from the following description of its preferred embodiments, which description should be taken in conjunction with the accompanying drawings.

BRIEF DESCRIPTION OF THE DRAWINGS

FIGS. 1A–C illustrate a hidden hologram used with a greeting card;

FIG. 2 illustrates, by a sequence of cross-sectional views, three specific methods of manufacturing and using a hidden hologram;

FIG. 3 is a flowchart that illustrates various alternative techniques for forming hidden holograms;

FIG. 4 is a plan view of a hidden hologram replica, before being separated into individual holograms, that contain images of prizes;

FIGS. 5 and 6 illustrate two hidden holograms made from the replica of FIG. 4;

FIG. 7 schematically illustrates a known method of forming the initial surface relief hologram replicas; and FIGS. 8 and 9 schematically illustrate two different processes for forming the top layer on the surface relief patterns of hologram replicas made by the process of FIG. 7.

DESCRIPTION OF THE PREFERRED EMBODIMENTS

Referring initially to FIG. 1A, a hidden hologram 11 according to the present invention is attached on an inside surface 13 of a greeting card. The greeting card is folded at 15 and may include various printing on the inside cover at 17 and printing 19 on the surface 13 to which the hidden hologram 11 is attached. The recipient of the greeting card cannot see the images stored in the hidden hologram 11 when the card is first received, so will normally initially read the printing 17 and 19 on the card. A cover film 21 is then removed from an underlying hologram replica 23 by hand by the greeting card recipient. Once the film 21 is removed, as shown in FIG. 1C, a holographic image 25 becomes visible in reflected light. This image can be additional writing, graphics, and the like.

Referring now to FIG. 2, various alternative processes for forming and using such a hidden hologram will be explained. FIG. 2 shows a cross section of a hologram replica 27 in which an image 29 is reconstructed in light reflected from a surface relief pattern 31. The replica 27 can be formed on a film in which the surface relief pattern 31 has been formed by impressing a master hologram against it with an elevated temperature, or on a supporting film that carries a coating formed by cooling or curing while in contact with a hologram master.

The processing steps shown in sequence in the left hand column of FIG. 2 will now be explained. In FIG. 2B, a layer of soft material 33 is applied to the hologram replica 27 in a manner to closely conforms to the microscopic surface relief pattern 31, as shown in FIG. 2C. The layer 33 is then hardened, generally by evaporation of a solvent or diluent, or by curing with an ultraviolet light or electron beam 35. The material chosen for the layer 33 has substantially the same refractive index as the material of the hologram replica 27, such that the addition of the layer 33 eliminates the viewability of the image 29 in light incident upon the layer 33. Under this condition, light is no longer reflected from the surface relief pattern 31 but rather is transmitted through both the covering 33 and the underlying hologram replica 27. The hologram replica 27 is usually also made of optically transparent material. The conventional step of depositing a thin, reflective metal layer onto the surface relief pattern 31 is obviously omitted in the hidden hologram forming processes being described.

The material that is chosen for the layer 33 also needs to have a characteristic that, after drying or curing, it is releasable from the surface relief pattern 31 without damaging that pattern. There needs to be enough adhesion so that the layer 33 remains in place during transportation and handling but not so much that it cannot be easily removed from the underlying hologram replica 27 by hand. In addition to the portion of the layer 33 formed by drying or curing material, a transparent film may be attached on the side of the coating opposite to that of the hologram replica 27. Such a film adds strength to the layer 33, if the dried or cured material does not itself have enough strength for a particular application. It is usually preferred, in order to avoid or minimize reflections, that this film have substantially the same or a similar refractive index to that of the layer 33.

The hidden hologram illustrated in FIG. 2C may, in many applications, be useable without doing anything further. However, it is often desired to attach the hologram to a substrate, as shown in FIG. 2D. A side of the hologram replica 27 opposite to the surface relief pattern 31 is attached to a substrate 37 by an adhesive layer 39. The substrate 37 can be paper, cardboard, stiff plastic material, or one of many other supporting structures.

FIG. 2E illustrates the peeling back of the layer 33 to again allow viewing of the image 29 in light reflected from the surface relief pattern 31. This reflection occurs because the transparent material forming the hologram replica 27 has a refractive index that is much different from that of the surroundings. Because the surface relief pattern 31 carries no reflective layer, as in the usual commercial hologram, the intensity of the reconstructed image 29 is not as bright as in those commercial holograms but is bright enough to be clearly observed.

It will be noted from FIG. 2E that the surface relief pattern 31 is also replicated on the underside of the layer 33. A mirror image of the image visible from the surface relief pattern 31 is viewable in light reflected from the surface relief pattern of the layer 33. That surface relief pattern and image are also hidden until the layer 33 is separated from the layer 27. In some applications, this may be useful apart from the hologram 27.

The steps shown in the middle column of FIG. 2 illustrate an alternative process of forming a slightly different product including a hidden hologram. In this example, as shown in FIG. 2F, the hologram replica 27 is attached by an adhesive layer 41 to a substrate 43 before its surface relief pattern 31 is covered. A soft covering layer 45 is then applied, as shown in FIG. 2G, followed by attaching a transparent film 47 over an outside surface of the coating 45 before it is dried or cured. This drying or curing takes place with ultraviolet light, electron beam energy, heat, cold, or the like, depending upon the material composition of the layer 45, as indicated in FIG. 2I. The specific materials and processes are chosen so that the layer 45 adheres to the film 47 sufficiently that the layer 45 is removed from the surface relief pattern 31 when the film 47 is peeled back by a person grabbing an edge of the film 47.

In the embodiment of FIGS. 2F–J, the coating 45 need not stop exactly at the edges of the hologram replica 27 but can extend beyond those edges onto surrounding portions of the substrate 43. Similarly, the film 47 can also extend beyond at least a portion of the edge of the replica 27, in the manner shown in FIGS. 2H and 2I. This gives a small lip that makes it easy for the film to be grabbed between a thumb and forefinger in order to remove it and the attached coating 45 from the surface relief pattern 31, as illustrated in FIG. 2J.

A modification of the process of FIGS. 2F–J is shown in the right hand column of FIG. 2. In this modified process, the coating 45 of the structure of FIG. 2G is cured, as shown in FIG. 2K, without use of the covering film 47. The structure shown in FIG. 2K is then the final hidden hologram structure. The coating 45 is removed by the use of adhesive tape 49. A piece of standard adhesive tape is adhered to a top surface of the cured coating 45, and the tape is then pulled upward to peal the coating 45 from the surface relief pattern 31, as illustrated in FIG. 2L. The adhesion of the coated 45 to the hologram replica 27 is thus made to be less than the adhesion of the coating 27 to the adhesive tape 49.

FIG. 3 is another illustration of the process steps to form hidden holograms according to the present invention. A first step 51 is shown to indicate the preparation of one or more master holograms having the surface relief pattern to be replicated formed in a relatively rigid material. A step 53 indicates the formation of hologram replicas from such a master. Three alternative techniques (a), (b) and (c) are indicated. A next step 55 coats the replicas with the liquid to form a coating having substantially the same refractive index as the underlined hologram replicas. There are also three alternative techniques (a), (b), and (c) indicted. Similarly, a coating curing step 57 has three alternative techniques indicated. In general, if technique (a) in step 53 is used, then the technique of (a) of steps 55 and 57 would also be used. Similarly, if the technique (b) is used in one of the steps, the (b) technique of the other two steps would also be utilized, and so forth. However, the techniques indicated in the steps 53, 55 and 57 can, in many circumstances, be mixed in different ways.

After the coated hologram replica is formed, a step 59 indicates that, in a typical case, the coated hologram replica structure is separated into individual holograms. Hologram replicas are usually manufactured in a continuous roll of material which, after completion, is then cut into individual holograms. As a final step 61, the individual coated hologram replicas may be attached to a substrate. It will be noted that, although the process of FIG. 3 proceeds with the steps in the order indicated, some variation of the order will occur in specific implementations. For example, the embodiment described with respect to FIGS. 2F–J attaches the hologram replica to the substrate before applying the coating, and omits the separation step 59.

One use of the hidden holograms of the present invention is as lottery tickets or other indicators of prizes having been won. One example of hidden hologram prize tokens is illustrated in FIGS. 4–6. In FIG. 4, a plan view of a hologram replica web is shown to contain several images of circles of different diameter with the writing indicating different prizes within the circles. The more valuable the prize, the larger the circle. After coating the surface relief pattern of the hologram web, it is separated into individual holograms along the rectilinear lines shown in FIG. 4. One such hologram is illustrated in FIG. 5 showing its coated layer being removed by hand to reveal the image of the prize won by the holder of this hologram. FIG. 6 shows another hologram made from the web of FIG. 4, with its coated layer being removed in order to be able to view the image of the prize.

In the specific example of FIGS. 4–6, the more valuable the prize identified by the word in a holographic image, the larger the circle of the image that surrounds that word. The prize redemption rule is then set to award a prize only to a holder of a hologram token of the type indicated in FIGS. 5 or 6 when the entire circle is within the boundaries of the token. As can be seen from FIG. 5, the relatively small circle for a free cola is totally within the token but the much larger circle for the computer prize of FIG. 6 is not. Therefore, the holder of the token of FIG. 5 would win a free cola and the holder of the token of FIG. 6 would win nothing.

For this specific prize system, the diameter of the circles are related to the dimensions of the rectilinear hologram token which is eventually formed. The diameter of the image of the circles must not exceed the smallest dimension of the individual hologram token but, for large value prizes, may be very close to that so that very few of the expensive prizes are awarded. Some degree of variation is desired to be introduced during the manufacturing process between the pattern of images formed on the hologram web of FIG. 4 and the overlaid rectilinear pattern which defines the edges of the individual hologram tokens. One way to introduce such variation is to move the rectilinear pattern laterally (between right and left of FIG. 4) with respect to the hologram image pattern of prize indications. This is most conveniently accomplished by moving a web of hidden holograms sideways in a cyclic manner as the web is being cut along its length.

Another way of providing such variation is to repeat the pattern of images, such as those shown in FIG. 4, in a period that is slightly more than the length of an integer number of individual holograms. This causes the hologram edges to be registered with the images differently along the length of the hidden hologram web.

Referring now to FIG. 7, a schematic diagram showing extrusion embossing that is currently used to commercially make hologram replicas is generally described. Between a rotating chilled roller 71 and a resilient roller 73 is passed a continuous length of substrate film 75. Attached around the roller 71 are a number of surface relief sub-master holograms 77. These sub-master holograms have traditionally been made of nickel material but more recently have been formed of hard plastic material that may be transparent or opaque. Introduced between the substrate film and the surface relief sub-masters 77 is a polymer material 79 from an extrusion die 81. The soft polymer material 79 is compressed between the sub-master relief patterns and the film 75, the cool roller 71 solidifying the polymer so that a continuous web 83 results with holograms repeated along its length. The hologram replica 27 of FIG. 2 can be made in this way.

FIG. 8 illustrates one specific production technique for adding the coating to the web 83 made by the process of FIG. 7, as one example, thereby to convert its hologram replicas into the hidden holograms of the present invention. The hologram web 83 is passed tightly around a chilled roller 85 while a second film 87 is moved between the hologram 83 and a resilient roller 89. A soft polymer material 91 is extruded from a die 93 between the hologram web 83 and the film 87. The result is a four layer web structure 95 that leaves the roller 85, which is then separated into individual hidden holograms. The polymer 91 is chosen so that it does not strongly adhere to the coating 80, and is of a lower process temperature, so that the surface relief pattern of the coating 80 is not thermally distorted.

An alternate technique for coating the hologram replica web 83 from the process of FIG. 7 is generally shown in FIG. 9. In this case, a polymer material 97 is extruded from a die 99 onto the surface relief pattern of the hologram replica web 83. The polymer 97 is chosen so that it does not strongly adhere to the coating 80, and is of a lower process temperature, so that the surface relief pattern of the coating 80 is not thermally distorted. No additional film is used, as it is in the embodiment of FIG. 8. The coated hologram replica web 83 is passed around a first chilled roller 101 with the soft polymer material 97 on the outside, and then around a second chilled roller 103 with the polymer layer 97 being urged firmly against the surface relief pattern of the hologram replica web 83. A result 105 is a three-layered structure of the hologram replica web 83 with a single layer coating carried by it.

If, in the embodiments of FIGS. 8 and 9, the temperature or composition of either of the respective polymer layers 91 and 97 is incompatible with the coating 80, an intermediate layer of material may be disposed between them. In the embodiment of FIG. 8, such a layer 111 is shown to be optionally applied over the layer 80 by a roller 113 as part of a standard coating system. Similarly, in the embodiment of FIG. 9, a layer 115 is optionally applied over the layer 80 by a roller 117 as part of a coater. In either case, the layers 111 and 115 are dried or cured before coming into contact with the respective polymer layers 91 and 97. If used, this optional layer then becomes part of the layer that is pealed by hand off of the hologram 80.

There are a wide variety of specific materials and techniques that are available for use in carrying out the various embodiments described above. As one set of examples, their are many choices of materials available for the pealable top layers when the hologram replica 27 (FIG. 2) to which they are applied is embossed polyolefin. This is because polyolefins have an inherently low surface energy. One choice for the layer 33 (FIGS. 2B–E) and the layer 45 (in the embodiment of FIGS. 2H–J) is a mixture of 40% ebecryl 3700, 40% trymethylolpropane triacrylate, 17% isobornyl acrylate (all from UCB Chemicals), and 3% irgacuro 184 manufactured by Ciba Geigy. Such a mixture is cured by application of ultraviolet light. A material suitable for each of the layers 111 and 115 (FIGS. 8 and 9) is ADCOTE 50C12 made by Morton International or D-709 made by Mica Corporation. For the embodiment of FIGS. 2K–L, the layer 45 can be made from Zenica Neocryl A1052. The film layer 47 of FIGS. 2H–J can be I.C.I. Melinex 454 polyester.

For the polymer 79 of FIG. 7, any one of a polyolefin, PETG copolyester, polyvinyl chloride or acrylic resin may be used. Low density polyethylene (LDPE) can be used as the polymers 91 and 97 of FIGS. 8 and 9, respectively. The substrate films 75 and 87 of FIGS. 7 and 8, respectively, can be polyolefin.

Although the various aspects of the present invention have been described with respect to its preferred embodiments, it will be understood that the invention is entitled to protection within the full scope of the appended claims.

It is claimed:

1. An optical structure, comprising:

a relief pattern formed in one surface of an optically transparent sheet having a first refractive index, said relief pattern diffracting light incident upon it into an image visible in light reflected from the relief pattern when interfaced with air, and a substantially optically transparent layer statically adhering to said one surface in a manner that normally fills in the relief pattern but is releasable therefrom by hand, said layer having a second refractive index substantially the same as the first refractive index, whereby the image is not visible when the layer is in place but becomes visible when the layer is removed from the surface relief pattern by hand.

2. The optical structure of claim 1, wherein the sheet and layer are substantially planar.

3. The optical structure of claim 1, wherein said layer includes a coating, and additionally comprising a film attached to the coating.

4. The optical structure of claim 3, wherein said film extends beyond at least a portion of an external periphery of said sheet, thereby facilitating removal of the layer from the surface relief pattern.

5. The optical structure of claim 1, additionally comprising a substrate to which is attached a second surface of the sheet opposite to the first surface.

6. An optical structure, comprising:
    a relief pattern formed in one surface of an optically transparent sheet having a first refractive index, said relief pattern providing an image visible in light reflected therefrom when interfaced with air,
    a substantially optically transparent layer statically carried by said surface in a manner that normally fills in the relief pattern but is releasable therefrom by hand, said layer having a second refractive index substantially the same as the first refractive index, whereby the image is not visible when the layer is in place but becomes visible when the layer is removed from the surface relief pattern by hand, and
    a substrate to which is attached a second surface of the sheet opposite to the first surface, wherein said substrate is a page of a magazine, book or greeting card.

7. The optical structure of claim 1, wherein said image includes an indication of a prize won by the holder of the optical structure.

8. The optical structure of any one of claims 1–7, wherein the surface relief pattern is a hologram.

9. A method of manufacturing a plurality of individual optical structures, comprising:
    providing a master surface relief pattern containing information of visible images,
    forming from said master a relief pattern in a surface of a sheet of substantially optically transparent material, thereby to render the images visible in light reflected from the surface relief pattern,
    coating the surface relief pattern with a substantially optically transparent material having a refractive index that is substantially the same as the refractive index of the sheet but which may be released therefrom by hand, thereby hiding the images from view until the coating is removed from the surface relief pattern, and
    separating the sheet into individual optical structures without releasing the coating therefrom.

10. The method of claim 9, additionally comprising attaching the individual optical structures to individual greeting cards.

11. The method of claim 9, additionally comprising attaching the sheets of individual optical structures to individual substrates.

12. The method of claim 9, additionally comprising attaching the sheets of individual optical structures to individual pages of magazines, books or greeting cards.

13. The method of claim 9 wherein providing a master surface relief pattern includes providing a surface relief pattern containing said visible images of a plurality of prize identifications, and wherein separating the sheet into individual optical structures includes separating the sheet to provide the individual optical structures with different ones of the plurality of prize identifications.

14. The method of any one of claims 9–13, wherein forming the relief pattern in the sheet of material includes embossing or casting, and coating the surface relief pattern includes coating the surface relief pattern with a material that conforms to the surface relief pattern and then solidifying the material.

15. The method of claim 14 wherein coating the surface relief pattern includes attaching a film to the coating material before solidifying the material.

16. The method of any one of claims 9–13, wherein providing the master surface relief pattern includes providing the surface relief pattern as a hologram.

17. A method of forming hidden images on substrates, comprising:
    providing replicas of a relief diffraction pattern in a surface of individual sheets of substantially optically transparent material in a manner that an image is visible in light reflected from the surface relief pattern,
    attaching individual replicas to individual substrates by adhering to the substrates sides of the sheets opposite to the surface relief pattern,
    coating the surface relief patterns of the replicas with a substantially optically transparent material having a refractive index that is substantially the same as the refractive index of the sheet but which may be released therefrom by hand, thereby hiding the images from view until the coating is removed from the surface relief patterns, and
    attaching to the coatings individual films that extend beyond edges of individual sheets, thereby facilitating removal of the films and coatings from the surface relief patterns to render the images visible.

18. The method of claim 17, wherein the coating is performed by coating the surface relief pattern with material that conforms to the surface relief pattern, and then, after attaching films to the coatings, solidifying the coatings.

19. The method of either of claims 17 or 18, wherein the diffraction replicas being provided are holograms.

20. A method of viewing a diffraction image, comprising:
    forming replicas of a relief diffraction pattern in a surface of a substrate of substantially optically transparent material in a manner that an image is visible in light reflected from the surface relief pattern,
    coating the surface relief pattern of the replicas with a substantially optically transparent material having a refractive index that is substantially the same as the refractive index of the substrate but which may be released therefrom by hand, thereby hiding the image from view until the coating is removed from the surface relief pattern,
    looking through the coating without observing the image,
    thereafter removing the coating by hand from the substrate, and
    thereafter viewing the image in light reflected from the relief diffraction pattern of the surface of the substrate.

21. The method of claim 20, wherein removing the coating from the substrate includes contacting the coating with a piece of adhesive tape, and then removing the tape and coating attached thereto from the substrate.

* * * * *